(12) United States Patent
Moyna

(10) Patent No.: US 7,640,996 B2
(45) Date of Patent: Jan. 5, 2010

(54) WALKING BEAM AND TIRE SYSTEM FOR AN EARTHMOVING SCRAPING DEVICE

(75) Inventor: John P. Moyna, N. Elkader, IA (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 12/234,019

(22) Filed: Sep. 19, 2008

(65) Prior Publication Data

US 2009/0095496 A1    Apr. 16, 2009

Related U.S. Application Data

(63) Continuation-in-part of application No. 12/199,449, filed on Aug. 27, 2008, which is a continuation of application No. 11/906,472, filed on Oct. 2, 2007.

(51) Int. Cl.
E02F 3/76 (2006.01)
A01B 15/00 (2006.01)

(52) U.S. Cl. ................. 172/799.5; 37/381

(58) Field of Classification Search ............ 37/381, 37/411, 416–419, 424–428, 304, 901, 431; 172/799.5, 610, 684.5, 197, 199, 777, 445.1, 172/794, 795

See application file for complete search history.

(56) References Cited

U.S. PATENT DOCUMENTS

| 2,078,501 A | 4/1937 | Maloon |
|---|---|---|
| 2,131,947 A | 10/1938 | Gilmore |
| 2,312,471 A | 3/1943 | Low |
| 3,040,638 A | 6/1962 | Atkinson |
| 3,099,191 A | 7/1963 | Averette |
| 3,358,569 A | 12/1967 | Averette |
| 3,474,550 A | 10/1969 | Frank |
| 3,962,804 A | 6/1976 | Hyler |
| 4,217,962 A | 8/1980 | Schaefer |
| 4,446,902 A | 5/1984 | Madec et al. |
| 4,490,929 A | 1/1985 | Lucas |
| 4,723,870 A | 2/1988 | Martinez |
| 4,823,421 A | 4/1989 | Kleynjans et al. |

(Continued)

FOREIGN PATENT DOCUMENTS

WO    WO 83/03785    11/1983

OTHER PUBLICATIONS

U.S. Appl. No. 12/199,449, filed Aug. 27, 2008, "A Walking Beam System for a Scraping Device," pp. 1-20, figs 1-7.

(Continued)

*Primary Examiner*—Robert E Pezzuto
(74) *Attorney, Agent, or Firm*—Michael Braunstein

(57) ABSTRACT

An earthmoving scraping device has a bowl-shaped frame with walls and a frame floor that define an interior for transporting material and a walking beam system for the rear wheels thereof that includes a suspension arm pivotally connected between the back end of the frame and a beam, the beam having first and second axles on separate sides of the beam. Connected to the axles is a tire system that includes a cylindrical metal rim with an outer surface and a plurality of solid tire segments, each of the tire segments having at least one track that is connected to a mounting plate, the mounting plates being circumferentially positioned adjacent to the outer surface of the rim.

20 Claims, 12 Drawing Sheets

U.S. PATENT DOCUMENTS

| | | |
|---|---|---|
| 4,950,102 A | 8/1990 | Zeitz |
| 5,452,489 A | 9/1995 | Gelder et al. |
| 5,460,460 A | 10/1995 | Alexander |
| 5,501,058 A | 3/1996 | Sonoyama et al. |
| 5,531,283 A | 7/1996 | Austin et al. |
| 5,728,327 A | 3/1998 | Borcoman et al. |
| 6,016,856 A | 1/2000 | Hynes |
| 6,021,829 A | 2/2000 | Rooney |
| 6,041,528 A * | 3/2000 | Broach ................ 37/431 |
| 6,328,115 B1 | 12/2001 | Carter, Jr. |
| 6,347,670 B1 | 2/2002 | Miskin |
| 6,360,393 B1 | 3/2002 | Fritz |
| 6,615,929 B2 | 9/2003 | Heckendorf |
| 6,910,289 B2 | 6/2005 | Moyna et al. |
| 7,044,070 B2 * | 5/2006 | Kaster et al. ................ 111/62 |
| 7,117,953 B2 | 10/2006 | Moyna |
| 7,316,252 B1 | 1/2008 | Heard |
| 2002/0056556 A1 | 5/2002 | Guiet |
| 2006/0123674 A1 | 6/2006 | Moyna |
| 2007/0039212 A1 | 2/2007 | Moyna |

OTHER PUBLICATIONS

U.S. Appl. No. 11/906,472, filed Oct. 2, 2007, "Walking Beam System, Tire System and Method for Using the Walking Beam System and the Tire System," pp. 1-22, figs 1-7.

* cited by examiner

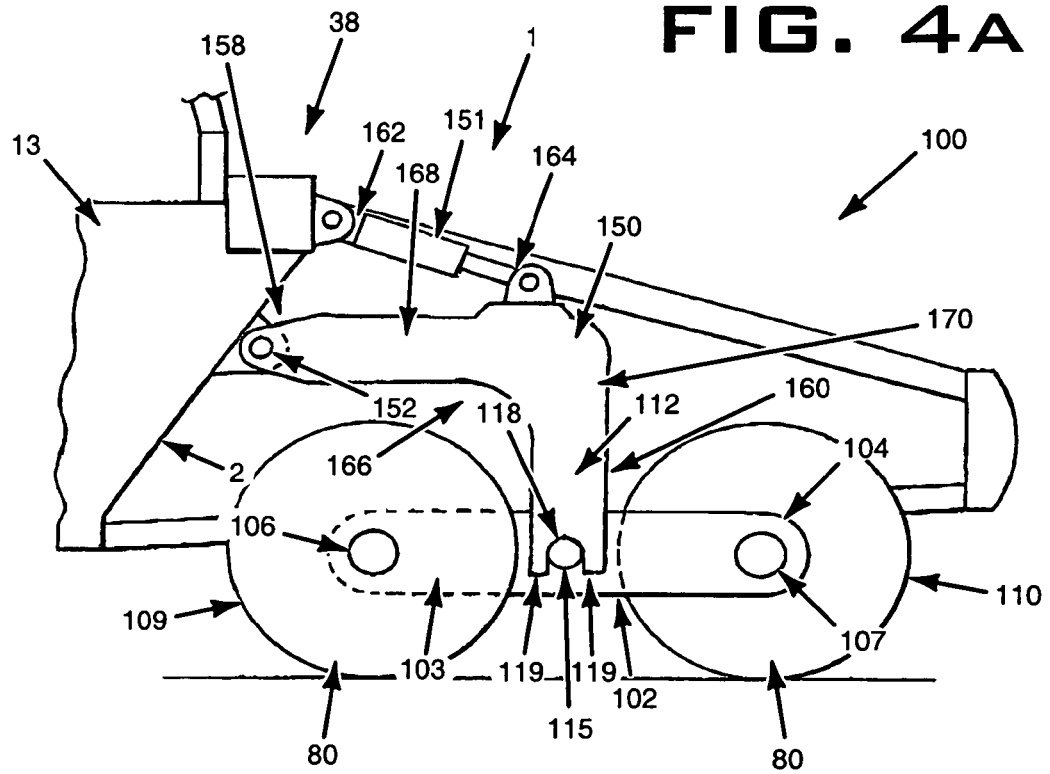
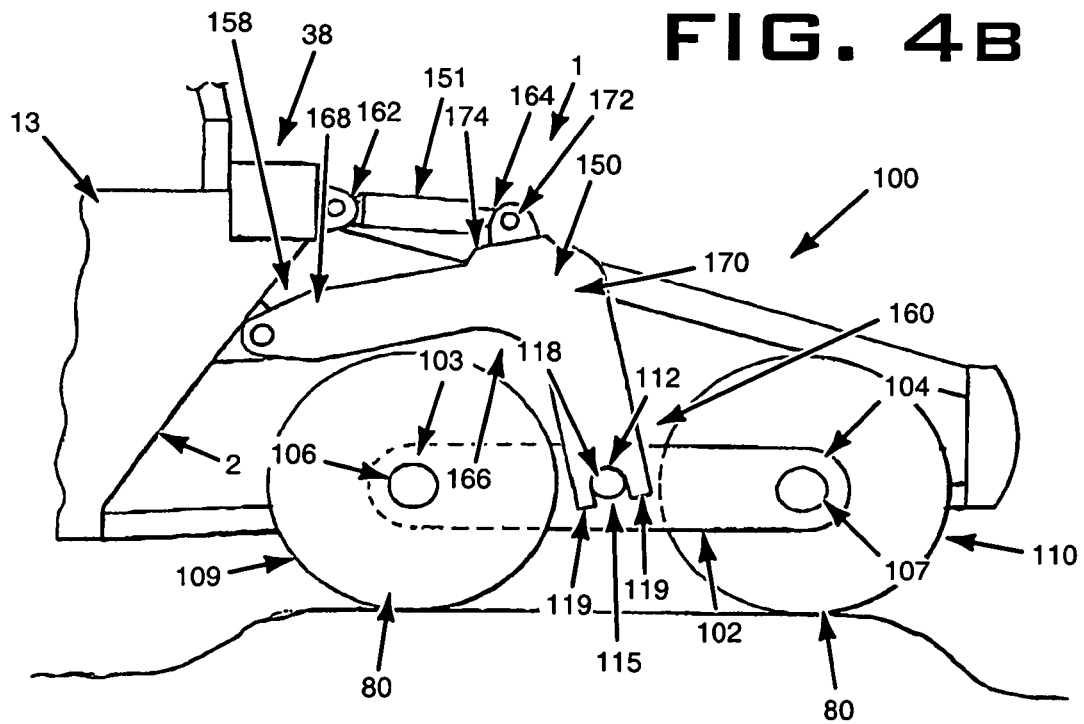

WALKING BEAM AND TIRE SYSTEM FOR AN EARTHMOVING SCRAPING DEVICE

This is a continuation-in-part of application Ser. No. 12/199,449, filed Aug. 27, 2008, which is a continuation of application Ser. No. 11/906,472, filed Oct. 2, 2007, the entire contents of which are hereby incorporated by reference.

TECHNICAL FIELD

The present disclosure relates generally to tire and suspension systems for off-highway machinery, and more particularly, to a combination of a walking beam and tire system for an off-highway machine such as a scraper.

BACKGROUND

The present invention generally relates to a walking beam system, a tire system and a method for using the walking beam system and the tire system. The walking beam system and the tire system may be attached to an earthmoving scraping device and may allow the earthmoving scraping device to travel over various types of surfaces. The walking beam system, the tire system, and the method for using the walking beam system and the tire system may have a central beam, one or more axles, and two forks having bearings. The central beam may transversely support a load of the earthmoving scraping device. One or more tires may be attached to the axles of the central beam. As a result, the walking beam system may provide stability, may allow the attached earthmoving scraping device to smoothly travel over irregularities in a road, and/or may provide increased ground clearance.

The walking beam system, the tire system and the method for using the walking beam system and tire system may include a rim to which is mounted a plurality of tire segments, each tire segment including a mounting plate and at least one track. The rim may attach to multiple tire segments via the mounting plates, wherein each mounting plate is separated from adjacent mounting plates by a distance. The tire segments may contain one or more tracks which may be connected, mounted, and/or laminated to the mounting plates. The tire segments may be removably attached to the rim, and the rubber tracks may be removably attached to the mounting plates. Each tire segment may be removed and replaced upon being damaged. As a result, quick and/or efficient removal of damaged tires and minimized costs associated with fixing a damaged tire as well as work delay associated with fixing the damaged tire may result.

Earthmoving generally involves breaking up the soil of the construction area. The soil may be used in the existing project and/or hauled away to a remote site. Like other construction projects, highway construction often requires an earthmoving step. To ensure safe and smooth roads, soil must be broken down and removed before paving of a roadway begins.

Highway systems are vital parts of any economy. Highways allow goods to be transported across the country and around the world. Furthermore, the travel of cars, trucks and other vehicles provides economic stimulus to areas they pass through. Given such importance, building roads and maintaining existing ones is undertaken by national governments and local municipalities throughout the world.

Removal of earth materials is performed by several different machines with the decision regarding use of specific machinery determined by the type of project. Several factors to be considered are the type of material to be removed, removal distance and the ultimate plans for the materials. Choosing the proper machine factors significantly into the final costs of the project. Using the wrong equipment for a project results in delays that lead to inefficient expenditure of labor and/or money. As a result, the process of removing earth materials may result in an economic burden to the overall cost of the project. Therefore, construction projects require use of the proper equipment as well as efficient and successful performance of the equipment.

Typically, earthmoving equipment, such as scrapers, may carry large volumes of materials. Scrapers may be towed or self-propelled. One such scraper has a frame shaped like a bowl and a lip that serves as a wall to prevent soil or other materials from leaving the bowl. To aid in removal and containment of materials, the lip may be attached to a cylinder which raises or lowers the lip. A blade is attached near the bottom of the bowl and below the lip. As the scraper is moved across an area of soil to be broken, the blade of the scraper may press into the soil, and the soil may be collected within the bowl. The lip is lowered to prevent the material from exiting the bowl during transport of the bowl to another area. After the soil is transported to a desired location, the collected material may be deposited by raising the lip to provide an open area to allow removal of the material from the scraper.

Many different types of scrapers have been built, including pull-scrapers, motor scrapers, twin-engine scrapers, paddle wheel scrapers, and auger scrapers. Transportation of the loads of these scrapers has always been subject to inefficient delays because many models include rudimentary tire systems that allow road irregularities to impede travel. In addition, commonly known tire systems are prone to damage that necessitates repair before further scraper use. As a result, a need exists for a scraper that also has more efficient and/or consistent scraper operation.

Many scrapers have areas that become worn and are costly for the user to maintain and/or to repair. One of these areas is the axle and tire area. Due to the rough terrain and heavy loads carried by the scraper, the tires and the axles may be subject to extensive wear. Sunken tracks or grooves in the road may form as construction machines travel along unpaved roads. The sunken tracks may inflict tire or axle damage or cause scrapers to get stuck in the channels. It may be difficult to remove the heavy, material-filled scrapers after the same becomes stuck. A stuck scraper may cause efficiency problems because the project is delayed, and construction ceases until the scraper is unloaded and freed from the rut. Furthermore, the unevenness of the roads causes these machines to vibrate. Vibration causes greater stress on the roadways, which further exacerbates the formation of road grooves. Vibration transmitted through rigid tire systems stresses the frame of the machinery which increases the likelihood of structural damage that necessitates repair.

Grooves or channels formed in the roads often results in lower productivity as tire damage becomes a greater possibility. Uneven roads and the channels that form as a result cause cuts, punctures, snags, tears, or complete tire blowouts. Flat or damaged tires can hinder completing a project within budget, particularly if tire damage occurs frequently or at a remote distance construction site.

Therefore, tire selection and maintenance plays an important role because productivity and/or payload unit costs depend on reliable and cost effective performance. Furthermore, improper tire inflation places additional stress on the tire system of the machine, resulting in tire damage. Since large scraper tires are difficult to replace, damaged tires may slow down the progress of any project that may result in project stoppage until a new tire is found or a new machine is secured. In either case, damaged tires often result in slowed work that increases the likelihood of cost over-runs.

The type of topography and/or soil scraped affects the overall performance of scrapers. Scrapers are inefficient in moist, rough, and/or rocky terrain. Rough terrain and bad weather may further strain the tires of the scraper and/or may require additional maintenance. When scraping earth materials in those environments, scrapers often need help from other machines to make full contact with the ground. Furthermore, certain topography and grades of land do not allow for efficient use of the scraper that causes problems related to clearance issues.

A need, therefore, exists for a walking beam system, a tire system and a method for using the walking beam system and the tire system that allow earthmoving equipment to function in a reliable and/or efficient manner in collection and/or removal of materials.

SUMMARY

The present invention generally relates to a walking beam system, a tire system and a method for using the walking beam system and the tire system. More specifically, the present invention relates to a walking beam system, a tire system and a method for using the walking beam system and the tire system which may contain a beam system for providing stability and ground clearance. The beam system may have a central beam transversely supporting a load. The central beam may have one or more axles in a parallel spaced relation. The axles may be on opposite sides of the central beam. The axles may connect one or more tires to the central beam. The walking beam system may also have one or more forks with bearings that attach the central beam to the device to be moved.

The present invention relates to a tire system and a method for using the tire system to engage a surface with at least one tire to provide movement for an attached earthmoving machine. The tire system may have a rim with one or more mounted tire segments attached to the rim. The tire segments may be removable and may be connected and/or bolted to the rim by a fastening device. The rim of the tire may be made from a metal material such as, for example, steel.

The tire segments include a mounting plate connected to one or more tracks. Each track may fit to the same dimensions as that of the associated mounting plate. Furthermore, each individual track may have an outer surface forming a determined portion of the total outer circumference of the tire. The tire segments may be separated from each other by a defined distance.

The walking beam system and/or the tire system may be attached to a scraping device containing a frame having a first end and a second end. The scraping device may have a front wall and back wall attached to the frame that may create an open-air, bowl-shaped interior. The scraping device may also have a lip pivotally attached to the first end. An ejecting mechanism may be provided to remove collected materials. The scraper may have a blade attached to the bottom of the frame. As the scraper moves across the ground, the blade may chop the surface and/or may push the materials into the bowl.

In an embodiment of the present invention, a scraping device is provided. The scraping device has a frame having walls defining an interior and further having a length defined between a first end and a second end wherein the second end is in a position opposite to the first end wherein opposing walls of the frame connect the first end to the second end of the frame; and a suspension arm having a first fork wherein the first fork has at least two prongs projecting from the first fork; a beam having a front end, a back end in a position opposite to the front end, a first side, a second side in a position opposite to the first side and a first pivot between the front end and the back end wherein the first pivot is connected to the first fork to allow the beam to rotate relative to the first fork. The scraping device has a first axle attached to the front end of the beam on the first side of the beam; and a second axle attached to the back end of the beam on the second side of the beam wherein the second axle is parallel to the first axle.

In an embodiment, the scraping device has a second fork having at least two prongs projecting from the second fork wherein the first fork attaches to the first side of the beam and the second fork attaches to the second side of the beam.

In an embodiment, the scraping device has a cylinder that connects the suspension arm to the frame wherein the cylinder provides movement of the suspension arm relative to the ground independent of movement of the frame.

In an embodiment, the scraping device has a second pivot that connects the suspension arm to the frame and allows vertical rotation of the suspension arm relative to the frame.

In an embodiment, the scraping device has a blade attached to the frame wherein the blade projects from a bottom of the frame.

In an embodiment, the scraping device has a plurality of tires connected to the frame wherein a first tire of the plurality of tires resides on the first axle and extends in a direction rearward past the second end of the beam and a second tire of the plurality of tires resides on the second axle and extends in a direction forward past the first end of the beam.

In another embodiment, a tire system for moving a scraping device is provided. The tire system has a rim; a plurality of tire segments including mounting plates radially connected to the rim wherein each of the plurality of mounting plates is separated from adjacent ones of the plurality of mounting plates by a defined distance wherein the plurality of mounting plates form a circumference wherein each one of the plurality of mounting plates forms a defined portion of the circumference; a fastener that connects the rim to the mounting plates; and a plurality of tracks is connected to the plurality of mounting plates.

In an embodiment, each one of the plurality of rubber tracks is laminated onto one of the mounting plates.

In an embodiment, the plurality of rubber tracks conforms to sizes of the mounting plates.

In an embodiment, the tire segments and/or mounting plates are identical.

In an embodiment, the defined portion of the circumference is the same for each one of the mounting plates.

In an embodiment, the plurality of tracks is removably connected to the plurality of mounting plates so that one of the plurality of tracks is removable by a user and replaceable with a substitute track.

In an embodiment, each one of the plurality of mounting plates has only one track attached.

In an embodiment, the plurality of mounting plates are removably connected to the rim so one of the plurality of tire segments is removable from the rim and replaceable with a substitute tire segment.

In an embodiment, the tire system has an axle rotatably attached to the rim.

In another embodiment, a method for collecting a material from a ground surface is provided. The method for collecting a material from a ground surface comprises the steps of providing a scraping device having a frame having walls defining an interior wherein the walls have an interior surface and the frame has a length defined between a first end and a second end further wherein a first opening exists at the first end and wherein the scraping device has a lip connected to the first end of the frame which is raised to uncover the opening at the first end; connecting a beam to the scraping device so that the beam vertically rotates with respect to the ground surface; connecting two axles to the beam so that each axle is located on a different side of the beam and further wherein each axle resides adjacent to a different end of the beam; attaching a tire to each axle wherein each tire has a rim and a plurality of tire segments, each tire segment having a mounting plate connected to a track, the mounting plates radially connected to the rim, wherein each one of the mounting plates is separated from an adjacent one of the mounting plates by a defined distance wherein each one of the mounting plates forms a defined portion of a circumference of the tire; and attaching tracks to the plurality of mounting plates.

In an embodiment, a method for collecting a material from a ground surface is provided further comprising the step of attaching a blade to the scraping device.

In an embodiment, a method for collecting a material from a ground surface is provided further comprising the step of moving a plate positioned at the second end of the frame toward the first end of the frame to force the material through the opening in the first end.

In an embodiment, a method for collecting a material from a ground surface is provided further comprising the step of removing one of the rubber tracks from the mounting plates and replacing the one rubber track with a substitute track.

In an embodiment, a method for collecting a material from a ground surface is provided further comprising the step of removing one of the plurality of mounting plates from the rim and replacing the one of the plurality of mounting plates with a substitute plate.

It is, therefore, an advantage of the present invention to provide a walking beam system, a tire system and a method for using the walking beam system and the tire system which may provide an earthmoving device with efficient travel over various topographies, including topographies that have irregularities in the ground surface, reducing the risk of delays associated with damage to the machine and attached tires.

Another advantage of the present invention is to provide a walking beam system, a tire system and a method for using the walking beam system and the tire system which may have one or more axles allowing one or more tires to be connected to the axles which provide movement, support and/or spacing between the tires needed for around clearance.

A further advantage of the present invention is to provide a walking beam system, a tire system and a method for using the walking beam system and the tire system which may have removable fasteners for attaching the mounting plates to the rim.

Yet another advantage of the present invention is to provide a tire that may regain functionality by the replacement of one component rather than replacing the entire tire.

A still further advantage of the present invention is to provide a walking beam system, a tire system and a method for using the walking beam system and the tire system that provides stability to an earthmoving device relative to an attachment between a frame and a tire.

Another advantage of the present invention is to provide a walking beam system, a tire system and a method for using the walking beam system and the tire system that allows an earth moving device to have increased ground clearance so that heightened areas in a road do not interrupt travel of the device.

Further, an advantage of the present invention is to provide a walking beam system, a tire system and a method for using the walking beam system and the tire system which may have one or more tires containing multiple, removable mounting plates attached to a rim providing a system for an airless tire which eliminates the possibility of a flat tire.

Additional features and advantages of the present invention are described in, and will be apparent from, the detailed description of the presently preferred embodiments and from the drawings.

FIG, 3A illustrates a perspective view of the walking beam system in an embodiment of the present invention.

Figure 3A:
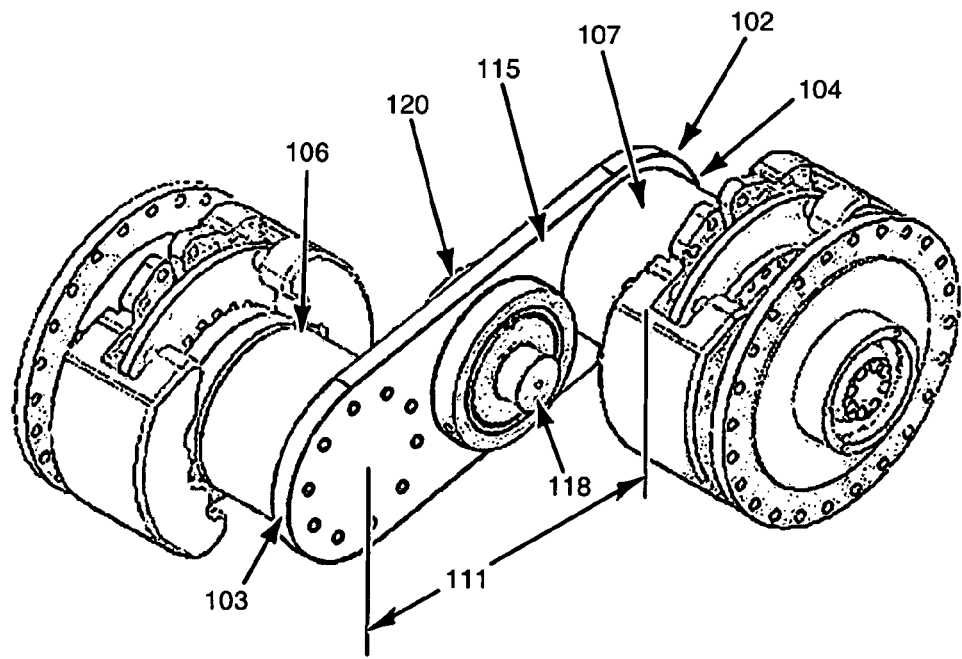
Figure 3B:
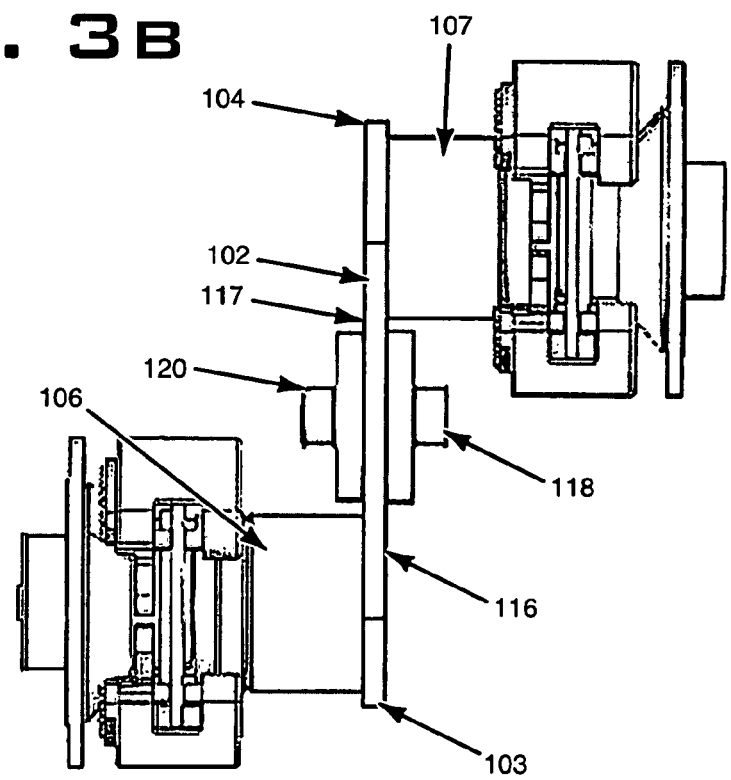

FIG. 3B illustrates an overhead view of the walking beam system in an embodiment of the present invention.

FIGS. 4A and 4B illustrate side views of the walking beam system in an embodiment of the present invention that includes a suspension arm.

Figure 5A:
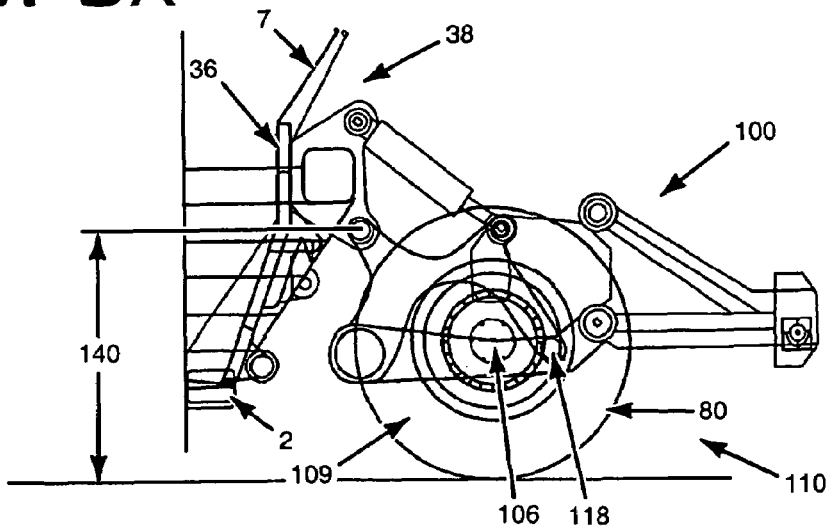
Figure 5B:
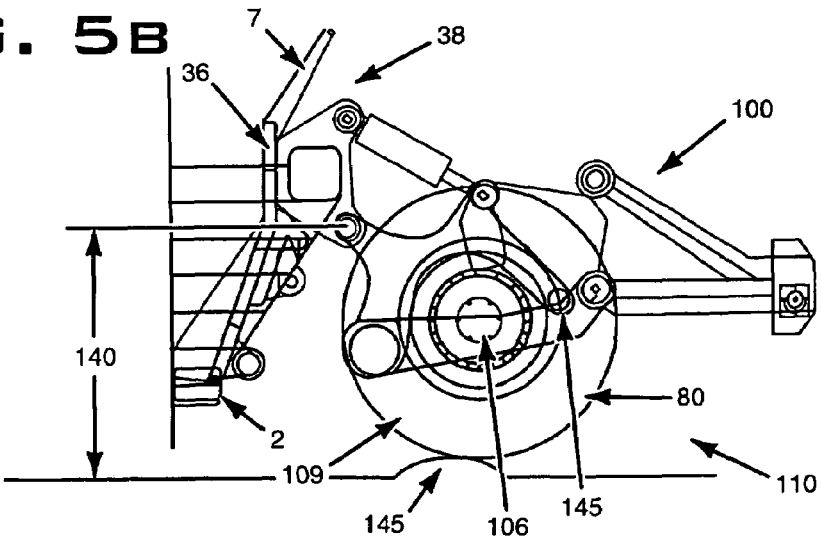
Figure 5C:
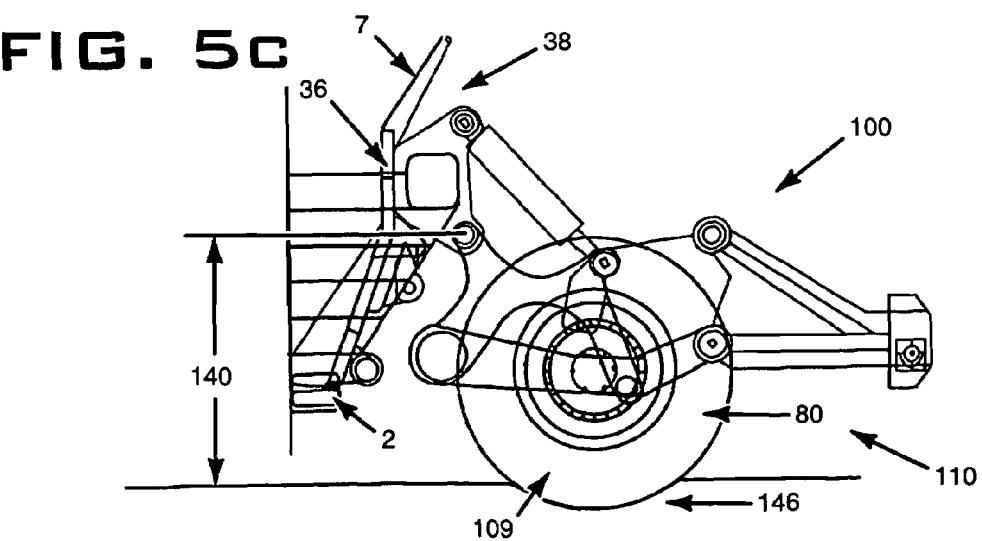

FIGS. 5A, 5B and 5C illustrate side views of the walking beam system in an embodiment of the present invention.

Figure 6:
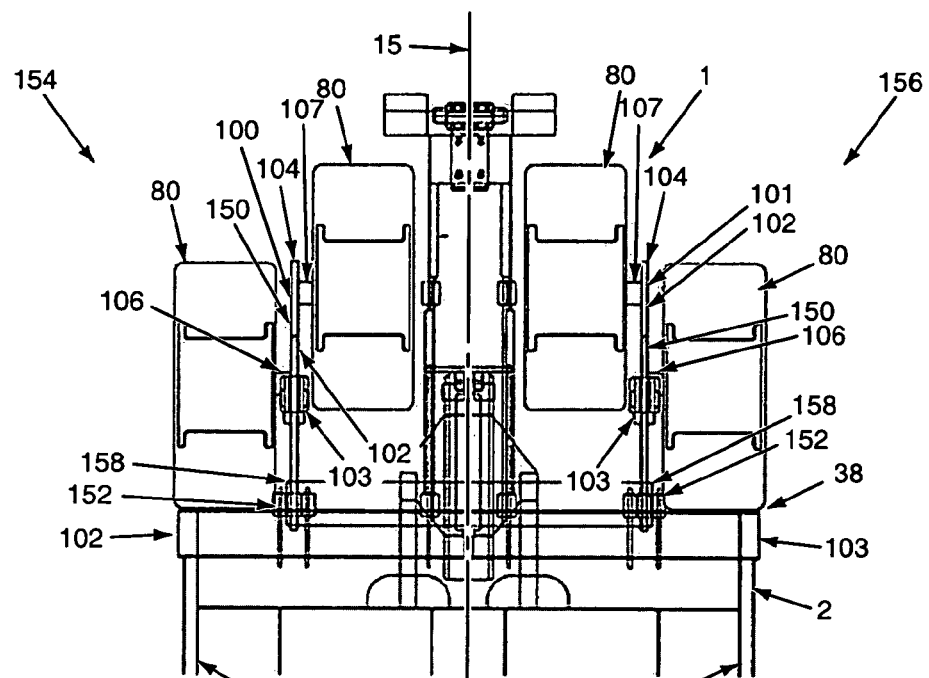

FIG. 6 illustrates an overhead view of an earth moving scraping device that includes two beam systems and multiple tires attached in an embodiment of the present invention.

Figure 7:
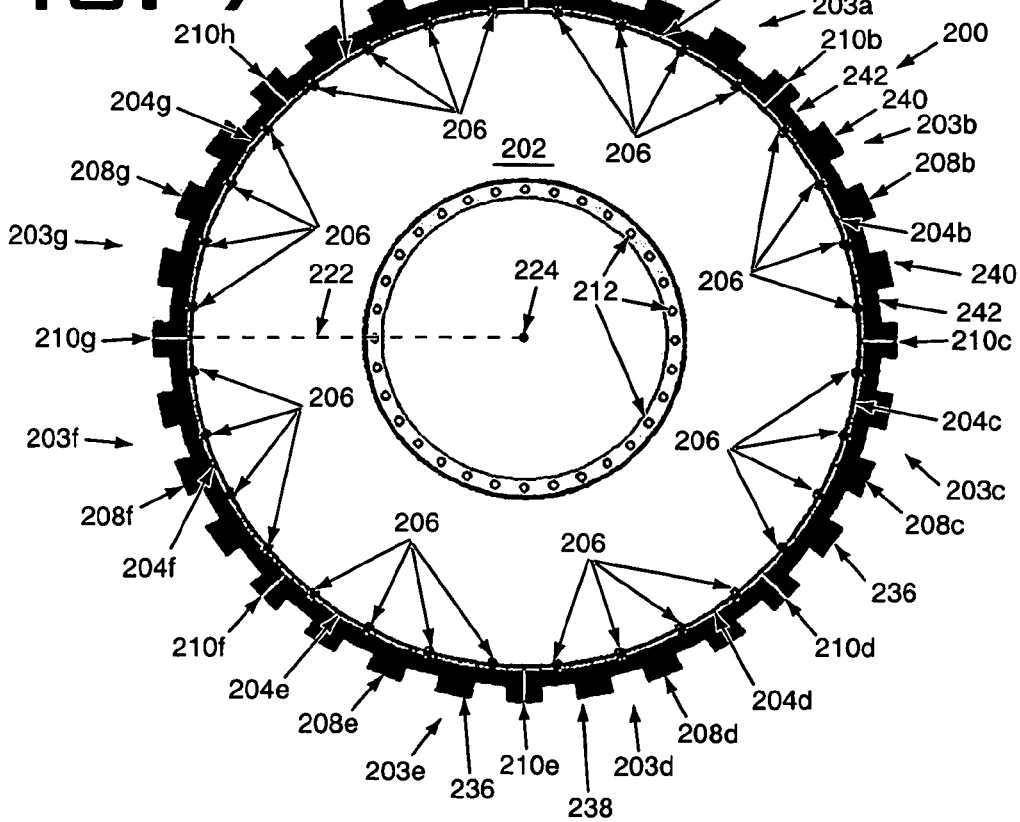

FIG. 7 illustrates a side view of the tire system in an embodiment of the invention.

Figure 8:
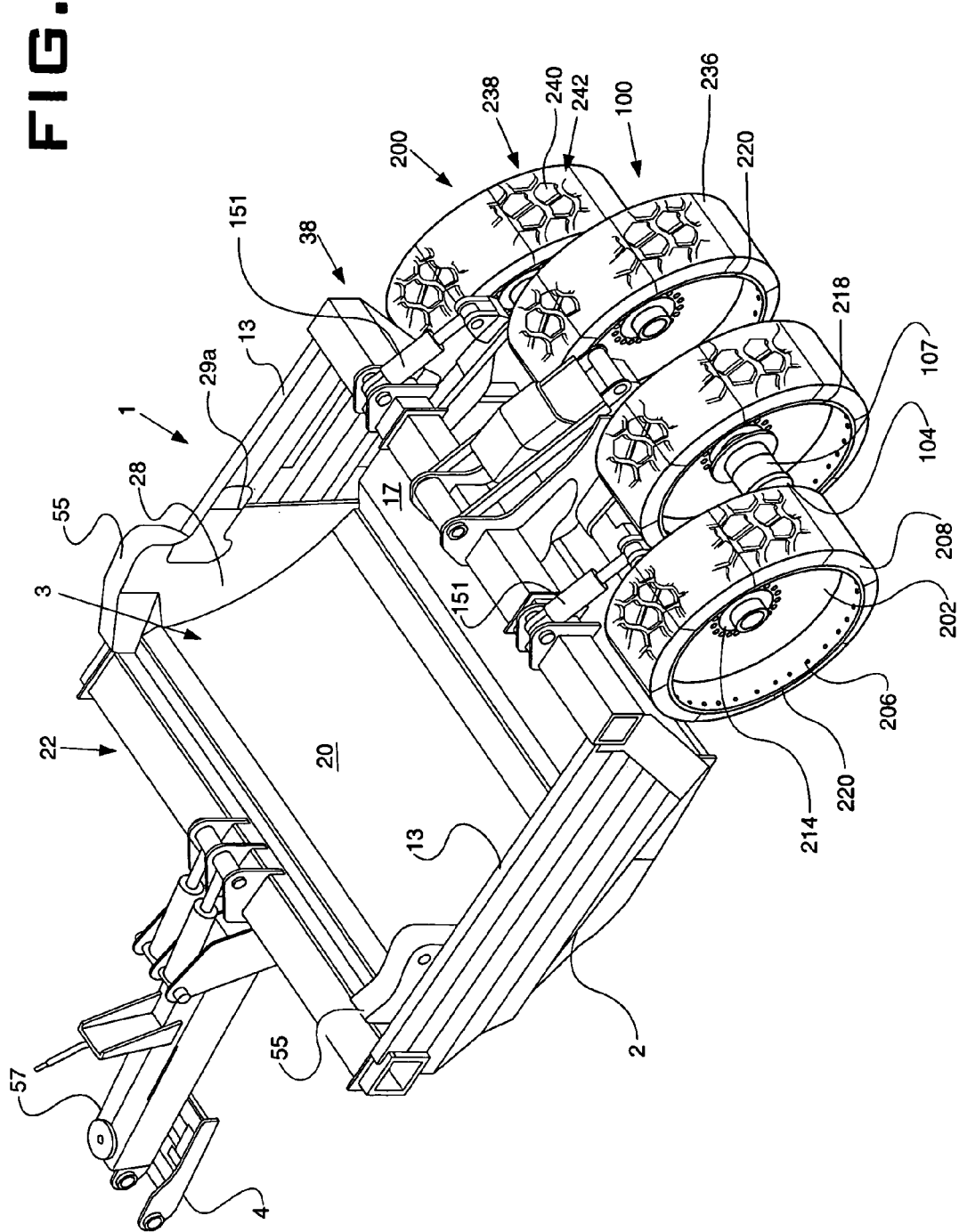

FIG. 8 illustrates a perspective view of an earthmoving scraping device of one embodiment shown with a combination of a walking beam and tire system.

Figure 9:
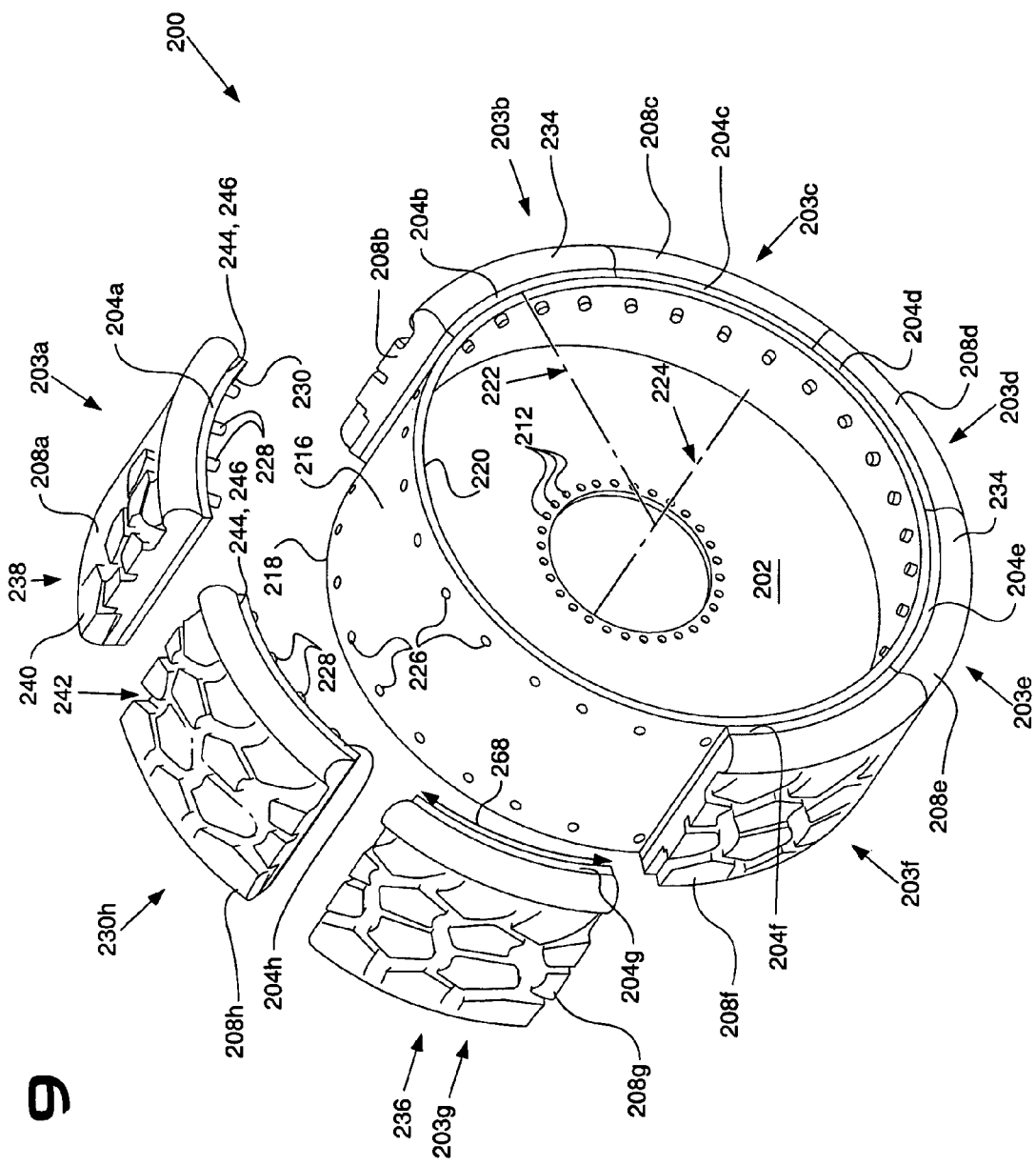

FIG. 9 illustrates a partially exploded view of one embodiment of a tire system in accordance with the disclosure.

Figure 10:
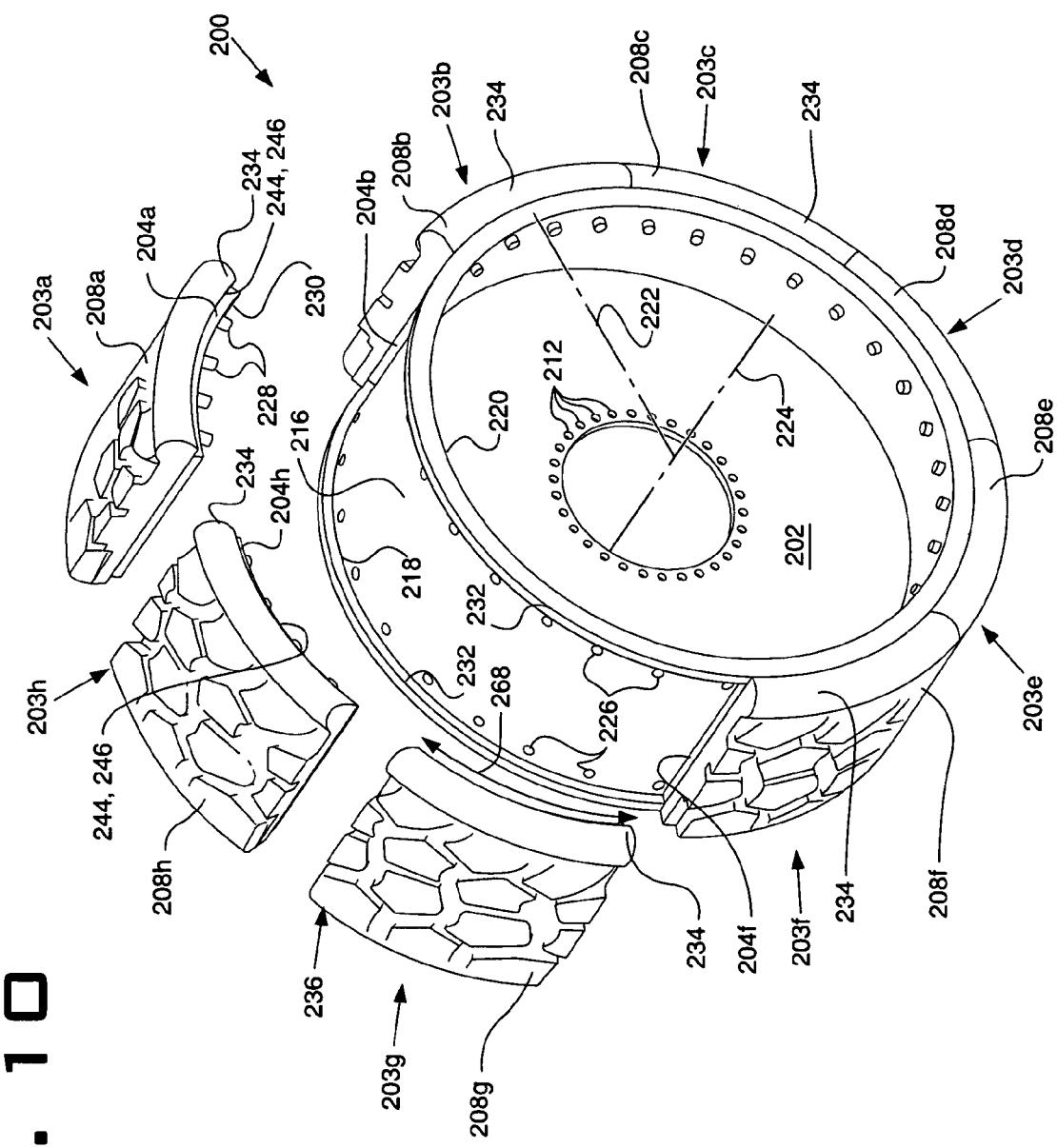

FIG. 10 illustrates a partially exploded view of another embodiment of a tire system in accordance with the disclosure.

Figure 11:
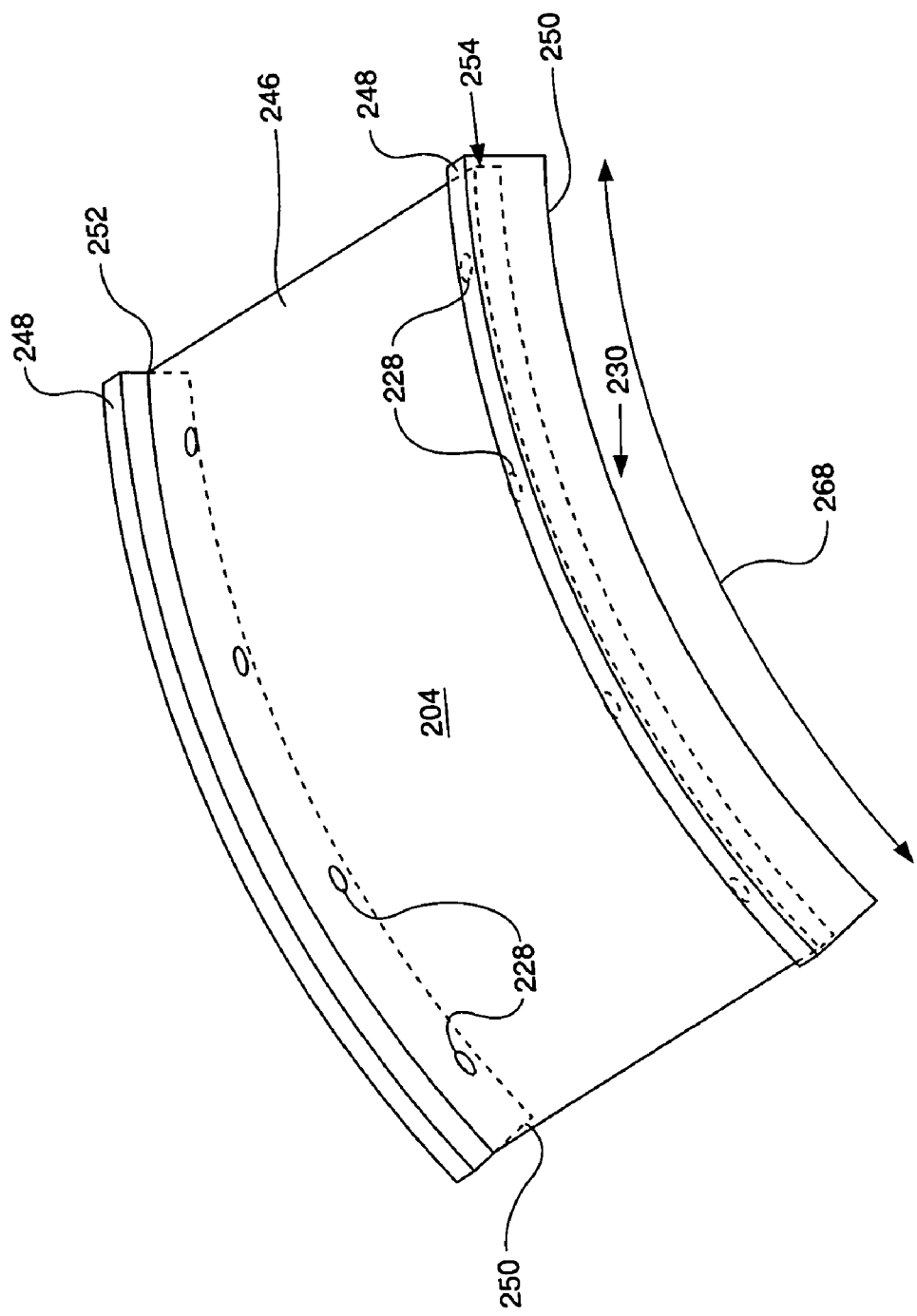

FIG. 11 illustrates a perspective view of one embodiment of a mounting plate for a tire system in accordance with the disclosure.

Figure 12:
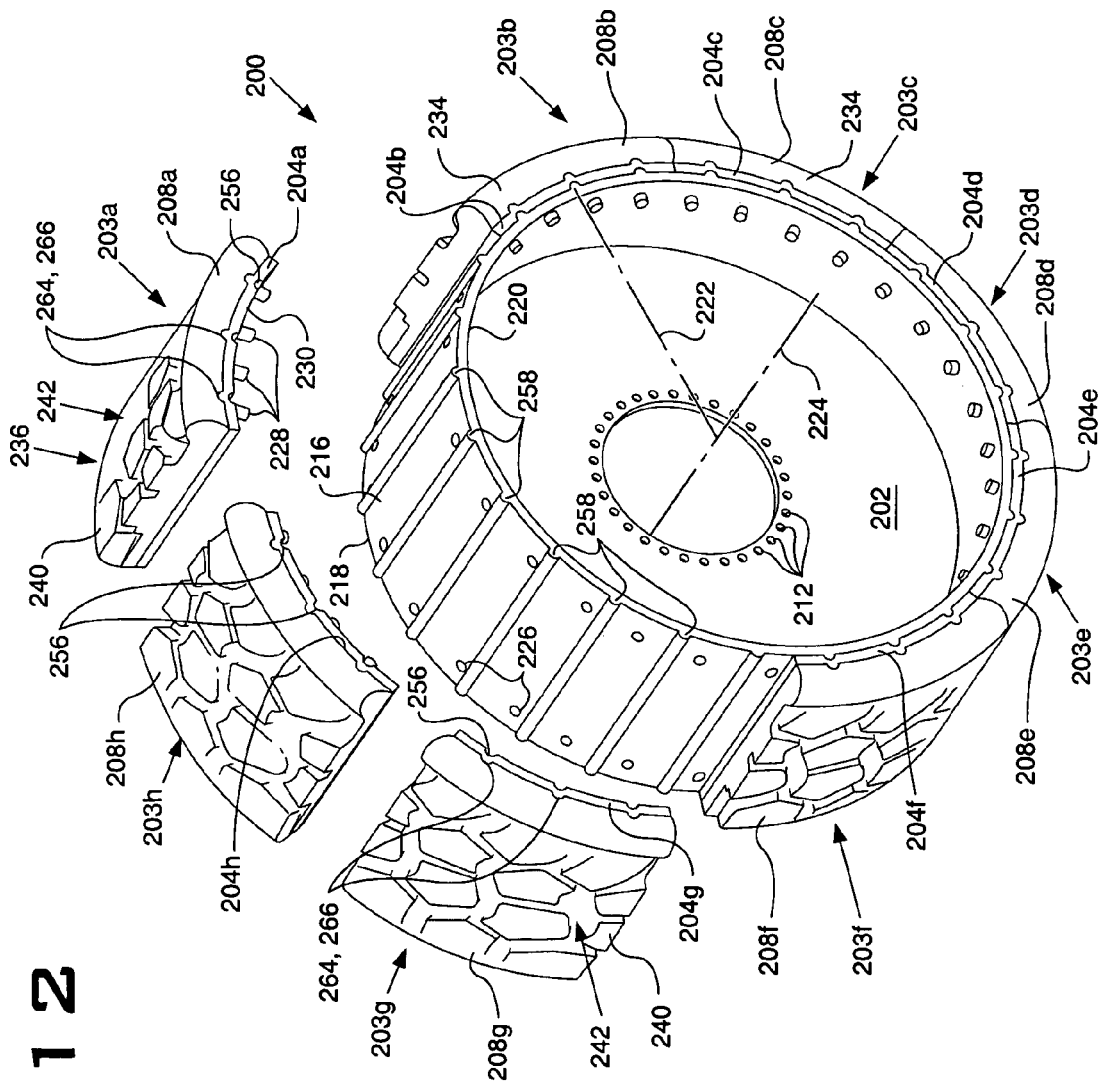

FIG. 12 illustrates a partially exploded view of another embodiment of a tire system in accordance with the disclosure.

Figure 13:
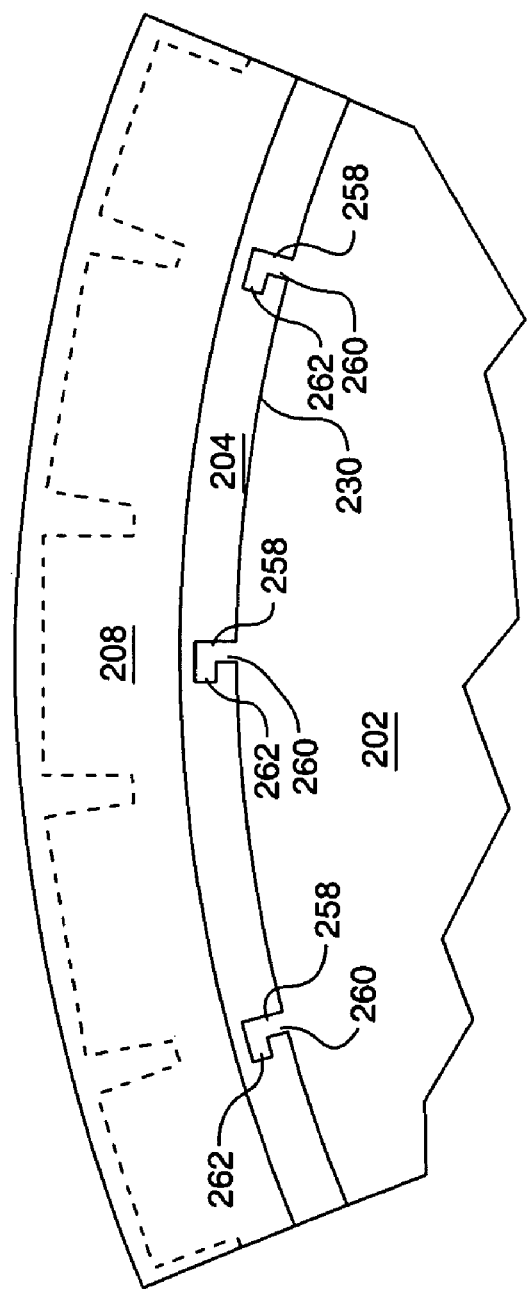

FIG. 13 illustrates a cross-section of another embodiment of a tire system having interlocking rims and mounting plates.

DETAILED DESCRIPTION

The present invention generally relates to a walking beam system, a tire system and a method for using the walking beam system and the tire system. The walking beam system 100 may have a central beam 102 having a first end 103 and a second end 104. The central beam 102 may transversely support a load of an earthmoving scraping device 1. A first axle 106 may be attached to the central beam 102 at the first end 103 and a second axle 107 may be attached to the central beam 102 at the second end 104.

Figure 1:
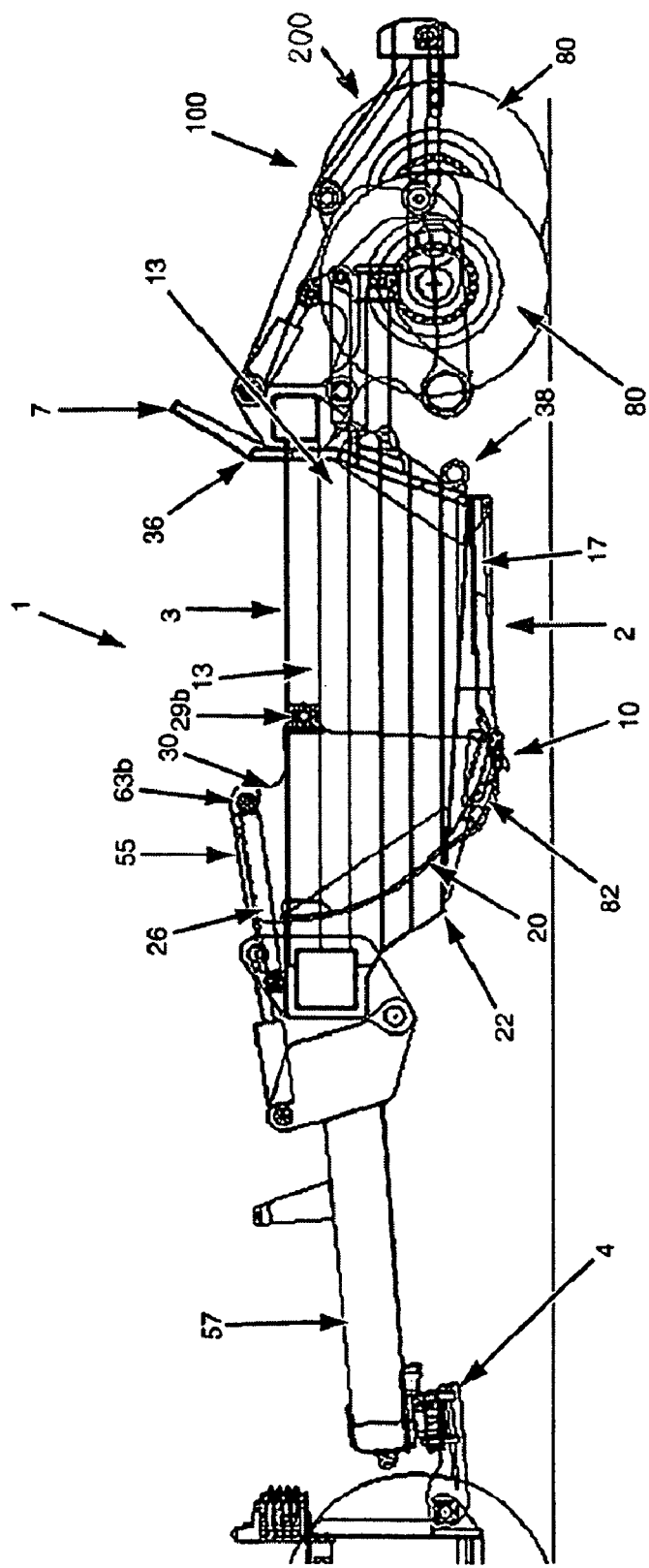
FIG. 1 illustrates a side view of the earth moving scraping device in an embodiment of the invention.

Referring now to the drawings wherein like numerals refer to like parts, FIG. 1 illustrates a scraping device 1 for which the walking beam system 100 and the tire system 200 may provide movement and/or stability. The scraping device 1 may have a bowl-shaped frame 2 having a floor 17 and walls 13 defining an interior 3 into which materials may be collected and/or transported. A blade 10, which may allow soil to be broken apart by the scraping device 1, may be attached to the frame 2 at front end 22 along an edge of floor 17. Adjacent to the blade 10 may be a router bit 82 which may assist in cutting into materials and may prevent the materials from causing wear to the scraping device 1.

Figure 2:
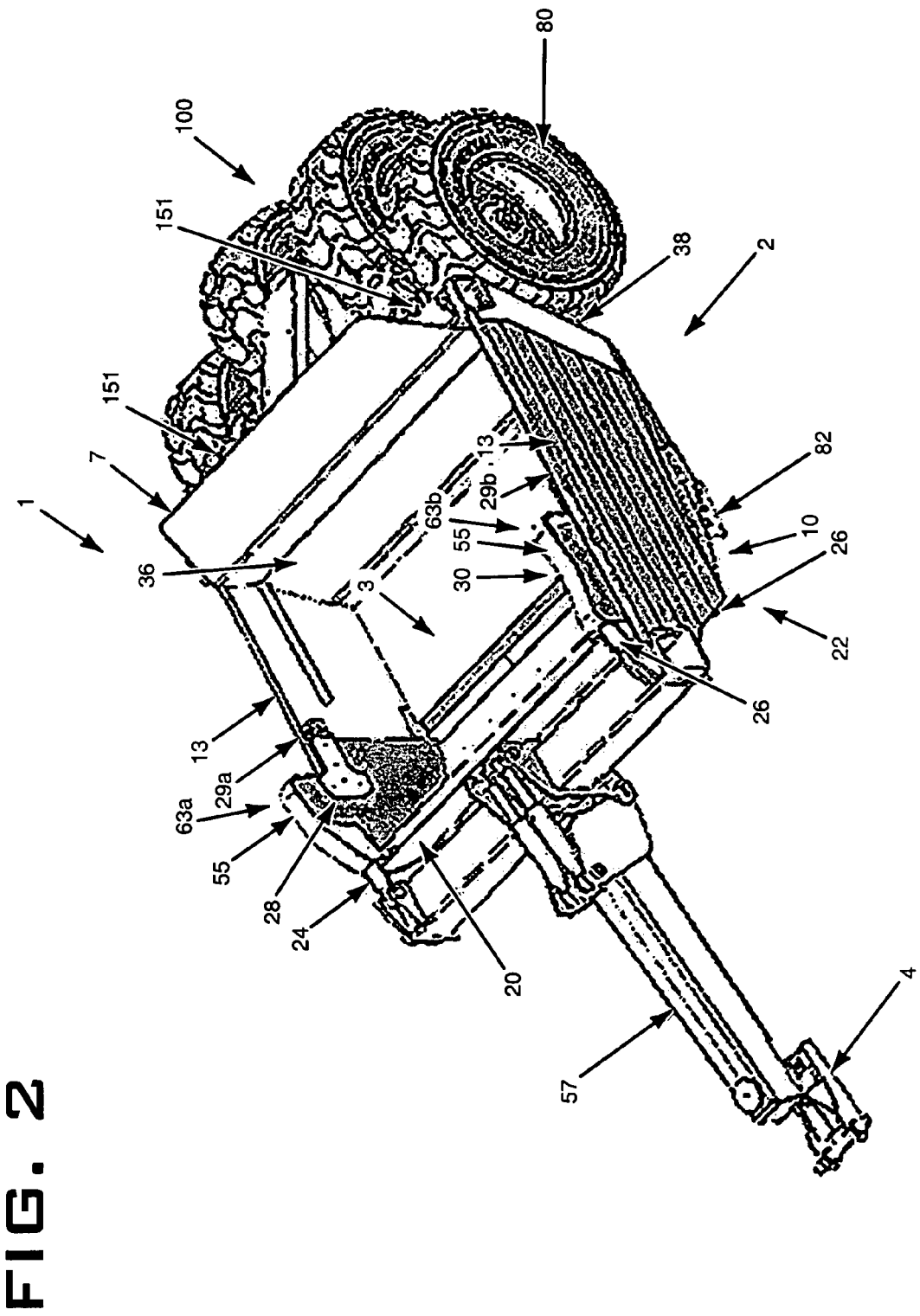
FIG. 2 illustrates a perspective view of the earth moving scraping device in an embodiment of the invention.

FIG. 2 illustrates an elevated view of the frame 2. A lip 20 may be attached to the frame 2 at a front end 22 of the frame 2. The size of the lip 20 may prevent materials within the frame 2 from falling from an opening (not shown) at the end 22 of the frame 2. The lip 20 may be pivotally connected to the frame 2 at points 29a, 29b on the sides 28, 30, respectively, of the lip 20. Cylinders 24, 26 may be attached to the lip 20 on the sides 28, 30 at points 63a, 63b. The cylinders 24, 26 may be partially shielded by flaps 55 that may be attached to the lip 20. The cylinders 24, 26 may be attached to the frame 2 at the front end 22 of the frame 2.

An ejector plate 36 may be positioned at a back end 38 of the frame 2. In addition, a guard 7 may be attached to, or integrally formed with, the ejector plate 36. The guard 7 may be a planar wall and may extend vertically from the ejector plate 36. Further, the guard 7 may prevent materials accumulated within the frame 2 from falling behind the ejector plate 36. The ejector plate 36 may move toward, or away from, the lip 20. As the ejector plate 36 moves forward, the materials within the frame 2 may be pushed by the ejector plate 36 through the opening within the frame 2.

The frame 2 may be connected to a hitch 4 by a tongue 57. The hitch 4 may allow the scraping device 1 to be connected to a tractor (not shown) or other vehicle. The tractor may pull the scraping device 1 along an area, such as, for example, an area of grass or soil to be broken and/or collected. Tires 80 may be associated with the scraping device 1 to enable the scraping device 1 to be transported.

As illustrated in FIGS. 3A and 3B, the walking beam system 100 may have a central beam 102 with a first end 103 and a second end 104. The central beam 102 may be connected to an earthmoving scraping device 1 to transversely support a load of the device 1. A first axle 106 may attach to the first end 103 of the central beam 102. A second axle 107 may attach to the second end 104 of the central beam 102 so that the pivot 115 may be located between the first axle 106 and the second axle 107. The first axle 106 may attach to a first side 116 of the central beam 102. The second axle 107 may attach to a second side 117 of the central beam 102 opposite in position to the first side 116 of the central beam 102. The first axle 106 may be separated from the second axle 107 by a distance 111. Multiple axles may be attached to the central beam 102 and may allow multiple tires (not shown) to connect to the central beam 102. At the pivot 115, a first pivot shaft 118 and a second pivot shaft 120 may extend from the central beam 102.

As illustrated in FIG. 4A, a suspension arm 150 may connect the central beam 102 to the scraping device 1. The suspension arm may have a first (front) end 158 that is pivotally connected at second pivot 152 to rear end 38 of frame 2, and a second (back) end 160 that is pivotally connected to the beam 102. As shown, the suspension arm 150 may provide a non-linear connection between pivot point 152 and pivot 115. For example, as shown, the suspension arm 150 may have a first portion 168 connected to the rear end of the frame 38 and a second portion 170 that extends downward from the first portion 168, forming an angle 166. The first portion 168 and second portion 170 of the suspension arm may be disposed perpendicular to each other, wherein angle 166, as shown, is a 90 degree angle.

A first tire 109 may be rotatably connected to the central beam 102 via the first axle 106, and a second tire 110 may be rotatably connected to the central beam 102 via the second axle 107. The suspension arm 150 may have a first fork 112 and/or a second fork (not shown). The first fork 112 and/or the second fork 113 may contain bearings (not shown). The first fork 112 and the second fork may connect to the central beam 102 at a first pivot 115 on the central beam 102. The first fork 112 may connect to the central beam 102 on the first side 116 of the central beam 102, and the second fork may connect to the central beam 102 on the second side 117 of the central beam 102. The first pivot shaft 118 may project from the first side 116 of the central beam 102 and may insert between prongs 119 of the first fork 112, and the second pivot shaft 120 may project from the second side 117 of the central beam 102 and may insert between prongs of the second fork. The second fork may be parallel to the first fork 112, and the forks may be perpendicular to the axles 106, 107. Alternatively, only one fork may be used to connect the central beam 102 to the frame 2 of the scraping device 1.

Referring again to FIGS. 3A and 3B, the distance 111 between the first axle 106 and the second axle 107 may be small relative to the size of the tires 109, 110. The first tire 109 may extend rearward toward the second end 104 of the central beam 102 past the first pivot 115. The second tire 110 may extend forward toward the first end 104 of the central beam 102 past the first pivot 115. Preferably, the distance 11 may be such that the first tire 109 extends rearward to a point past the second end 104 of the central beam 102, and the second tire 110 extends forward to a point past the first end 103 of the central beam 102. In a preferred embodiment, the distance 111 between the first axle 106 and the second axle 107 is approximately one foot. However, the distance 111 may be from approximately one inch to approximately four feet.

As illustrated in FIG. 4A, the suspension arm 150 may be connected to back end 38 of frame 2 of the scraping device 1 by a cylinder 151. A first end 162 of the cylinder being connected to the back end 38 of the frame, and a second end 164 of the cylinder being connected to the suspension arm 150. In one embodiment, the second end of 164 of the cylinder may be connected to a pivot disposed on an upper surface 174 of the first portion 168 of the suspension arm 150. If the central beam 102 moves, such as, for example, during travel over irregularities in a road, the cylinder 151 may allow the suspension arm 150 to move without transmitting vibrations from the suspension arm 150 to the frame 2 of the scraping device 1. Because the cylinder 151 may lessen vibrations of the frame 2 of the scraping device 1, the cylinder 151 may provide smooth travel. By keeping the frame 2 of the scraping device 1 at a consistent position relative to the ground, the angle of the blade 10 of the scraping device 1 may be maintained at a consistent angle.

The suspension arm 150 may rotate vertically relative to the ground. In a preferred embodiment, the suspension arm 150 may be rotatably attached to back end 38 of frame 2 of the scraping device 1 at a second pivot 152. For example, the suspension arm 150 may rotate in a position upward in response to upward movement of the central beam 102 that may be caused by a road irregularity, as illustrated in FIGS. 4A and 4B. The rotation of the suspension arm 150 in response to the upward movement of the central beam 102 may preclude vertical movement from being transmitted to the frame 2. The cylinder 151 may further absorb vertical movement if the suspension arm 150 rotates. Therefore, the suspension arm 150 of the walking beam system 102 may maintain the scraping device 1 at a consistent position relative to the ground and may provide smooth travel for the scraping device 1.

The central beam 102 may rotate vertically relative to the ground at the first pivot 115 while the pivot shafts 118, 120 are held between the first fork 112 and the second fork (not shown). For example, the central beam 102 may rotate in response to irregularities in the road that may cause vertical movement of the first tire 9 upwards and vertical movement of the second tire 10 in a direction downward. If the central beam 102 is connected to the frame 2 of the scraping device 1, the rotation of the central beam 102 in response to the road irregularities may preclude vertical movement being transmitted from the tires 109, 110 to the frame 2 of the scraping device 1. Therefore, the walking beam system 2 may maintain the scraping device 100 at a generally consistent height despite road irregularities, such as bumps or divots. As a result, smooth travel is provided by maintaining clearance below the device and/or by maintaining an angle of the blade 10.

For example, as illustrated in FIGS. 5A and 5B, as the scraping device 1 travels over an irregularity 145 in the road, such as a bump or mound of material, the first tire 109 may rotate vertically upward relative to the frame 2 to traverse the irregularity. As a result, the first end 103 of the central beam 102 may also rotate vertically upward relative to the frame 2, as illustrated in 4A and 4B. Correspondingly, the second tire 110 and the second end 104 of the central beam 102 may rotate in a direction vertically downward relative to the frame 2. As the first tire 109 traverses the heightened irregularity 145, the first tire 109 and the first end 103 of the beam may rotate in a direction vertically downward relative to the frame 2. Because the tires 109, 110 may move vertically in response to the bump without moving the frame 2 of the scraping device 1, the scraping device 1 may maintain a generally consistent distance 140 from the road and/or may smoothly travel the road without transfer of stress and/or vibration.

If the scraping device 1 travels across a depression 146 in the road, such as a divot or a pothole, the first tire 109 may rotate in a direction vertically downward relative to the frame 2 to traverse the road depression. As a result, the first end 103 of the central beam 102 may rotate in a direction vertically downward relative to the frame 2, as illustrated in FIGS. 5A and 5C. Correspondingly, the second tire 110 and the second end 6 of the central beam may rotate vertically upward relative to the frame 2. As the first tire 109 traverses the depression 146 in the road, the first tire 109 and the first end 103 of the beam may rotate in a direction vertically upward relative to the frame 2. Because the tires 109, 110 may move in a direction vertically in response to the depression 146, the scraping device 1 may maintain the generally consistent distance 140 from the road and thus traverse irregularities in the road.

In addition, vertical movement of the first tire 109 and/or the second tire 110 may cause the suspension arm 150 to rotate at the second pivot 152, as illustrated in FIGS. 4A and 4B. Rotation of the suspension arm 150 may further prevent vertical movement of the tires 109, 110 from being transmitted to the frame 2 of the scraping device 1. The cylinder 151 may absorb shock and may allow the suspension arm 150 to rotate without transfer of the movement of the suspension arm 150 to the frame 2 of the scraping device 1. Because the suspension arm 150 may move vertically in response to the road, the scraping device 1 may travel the road without transfer of stress and/or vibration to the frame 2.

In a preferred embodiment, two walking beam systems 100, 101 may be utilized, as illustrated in FIG. 6. The walking beam systems 100, 101 may be attached to a scraping device 1 so that the walking beam systems 100, 101 are adjacent one another. For example, the frame 2 of the scraping device 1 may have a left side 154 and a right side 156. A first walking beam system 100 may reside near the left side 154 of the frame 2, and a second walking beam system 101 may reside near the right side 156 of the frame 2. The walking beams 100,101 may be disposed on opposing sides of longitudinal axis 15, the first (front) axles 106 disposed at the first (front) end of the beam being proximate the back end 38 of the frame 2 and extending outwardly from the longitudinal axis 15 in opposite directions. Accordingly, rear (second) axles 107 extend inwardly, towards axis 15.

As shown, the walking beam systems 100, 101 are independently connected to the back end 38 of the frame 2 via their respective pivot points 152 such that the walking beams 100,101 may move independently of each other for a more level and smooth ride over adverse terrain.

FIGS. 7 and 9 illustrate one example of the disclosed tire system 200. The tire system 200 may be used to move earthmoving equipment and/or may be connected to the walking beam system 100 as shown in FIG. 8. The tire system 200 generally includes a cylindrical rim 202 and detachable tire segments 203a-203h having mounting plates 204a-204h and tracks 208a-208h.

Rim 202 is generally cylindrical, having an outer surface 216 bounded by inner 218 and outer 220 circumferential edges, relative to the position of the axle, and having a radius 222 from wheel axis 224. The rim 202 may be rotatably attached to an axle hub 214 (FIG. 8) via, for example, circumferentially disposed openings 212.

The mounting plates 204a-204h may be attached, connected and/or bolted to the rim 202 by fasteners 206. The rim 202 may include a plurality of spaced openings 226 that are aligned with corresponding plate openings 228 (FIG. 11) for receiving fasteners 206. In an alternative embodiment (FIG. 9), mounting plates 204a-204h may include a plurality of threaded studs 228 extending from inner surface 230. Fasteners 206 and/or studs 228 may include a threaded end for receiving corresponding nuts for tightening the mounting plates 204a-204h to the rim 202. Alternative methods of fastening the mounting plates 204a-204h to the rim 202, for example, via clamps, or bolts that engage radially extending portions of either the mounting plates or rim (not shown), should be appreciated by those of skill in the art.

In another embodiment, shown in FIG. 10, the rim 202 may include a retaining and/or protective portion 232 that extends radially outward from one or both of edges 218, 220. As shown, portion 232 may be a circumferential lip that extends over a portion of tire segments 203a-h, including mounting plates 204 and/or at least a portion of tracks 208. In one embodiment, portion 232 extends over a portion of sidewall 234 of the tire, providing protection and/or support to the tracks 208 and, in particular, the junction between the mounting plates 204 and tracks 208. In an alternative embodiment, retaining portion 232 may include alternately positioned and/or shaped flanges or tabs that extend from outer surface 216 and/or edges 218,220. For example, spaced apart arcuate lips may be positioned about the circumference of the rim 202. Other configurations should be apparent to those of skill in the art.

Tire damage commonly occurs at the sidewalls 234 during off-highway operations, and portion 232 may provide additional tire protection, increasing the life of the tire segments 203 and decreasing machine downtime. Lip 232, or other configured portion 232, may also provide support against lateral forces moving against the tire segments 234 that may dislodge the tire segments 234, tracks 208, and/or damage fasteners 206 or studs 228.

In an alternative embodiment, shown in FIG. 11, mounting plate 204 may include one or more retaining portions 248, 250. As shown, the arcuate mounting plate 204 includes first and second side edges 252, 254. Retaining portions 248 may extend radially outward, providing retention and/or protection for the tracks 208. Retaining portions 250 may be provided on first and/or second side edge 252, 254 to engage outer and/or inner edges 218, 220 of the rim. These inwardly extending retaining portions 250 may also serve as a guide for installation, making it easier to align the openings 228 with rim openings 226, and partially securing the mounting plates 204 while the fasteners 206 are placed and secured.

In yet another embodiment, shown in FIG. 12, the rim 202 and mounting plates 204a-h may be provided with mating recesses (grooves) 256 and protrusions 258 that serve to guide positioning and/or resist movement of the tire segments 203 during machine operation. This may relieve some of the loads applied to the fasteners during operation and decrease the possibility of tire segments 203 becoming misaligned or dislodged. As shown, the protrusions 258 may be in the form of transversely disposed ridges that extend between the edges 218, 220 of the rim, with corresponding transversely disposed grooves 256 on the inner surface 230 of mounting plates 204. Alternatively, the protrusions 258 may be disposed on the mounting plates 204, with corresponding grooves 256 disposed on the rim 202. Numerous other forms of protrusions 258, such as bumps, cylindrical or other shaped extensions, in numerous orientations, angled, offset, and like, may also be employed. Other embodiments (FIG. 13) may include protrusions 258 that interlock with the corresponding surface, such as where the protrusions 258 include a first radial portion 260 with an interlocking portion 262 positioned perpendicular thereto. The mounting plate 204 would then be positioned on the rim 202 by sliding the tire segment 203 into position along the grooves 256, and then, optionally, fastened into place. Similar protrusions/recesses 264,266 may be disposed between the tracks 208 and mounting plates 204 (FIG. 12).

Tracks 208a-208h may be connected, such as by lamination, adhesives, bonding, fasteners, or a combination thereof, to the mounting plates 204a-204h. Tracks 208 may include sidewalls 234 and an outer surface 236 that typically includes a tread 238 having conventional lugs 240 and grooves 242. As shown in FIG. 7, the tread 238 may consist of transversely oriented, spaced lugs 240. An alternative embodiment for off-highway earthmoving machinery is shown in FIGS. 8-10, and 12. Numerous configurations of treads may be made available that are suitable for a wide range of operating conditions and are well known in the art. For example, in heavy or wet clays, relatively open, deep treads may be preferable. Alternatively, in drier (low moisture) or sandy conditions, relatively thin treads may be preferable. In rocky, hard, uneven terrain, the thickness of the tire may be reduced to provide less sidewall that may be damaged. However, this may be balanced against the need for thicker, more resilient treads to absorb greater shock loads. The composition of the treads may also vary, typically being made of rubber, metals and composites. These and other considerations are well known in the art of tire and tread design. In fact, it is contemplated that tire segments of differing characteristics can be provided in connection with the disclosed tire system to suit specific or changing applications for more efficient machine operation.

The rubber tracks 208a-208h may conform to sizes and/or shapes of the mounting plates 204a-204h. That is, the tracks 208 may have an inner surface 244 that has substantially the same defining dimensions as outer surface 246 of mounting plates 204. As shown in FIGS. 7, 9, 10, and 11, one rubber track may be connected to the mounting plates 204a-204h. However, it is contemplated that multiple tracks, of the same or varying size and/or type, may be connected to a single plate 204. For example, two or more tracks could be positioned circumferentially and adjacent one another on the same mounting plate.

The mounting plates 204a-204h may be separated from each other by defined distances 210a-210h. In an embodiment, the defined distances 210a-210h may each be less than one inch. In another embodiment, the defined distances 210a-210h may be equal. In a preferred embodiment, the defined distances 210a-210h may each be approximately ⅛ of one inch.

The mounting plates 204a-204h may form a circumference. In a preferred embodiment, the circumference is circular. Each of the mounting plates 204a-204h may form a portion of the circumference. In an embodiment, each of the mounting plates 204a-204h may form an equal portion of the circumference. For example, an embodiment having five mounting plates (not shown) may have the mounting plates 204a-204h that are each about 20% of the circumference. In an alternative embodiment, mounting plates 204 of differing size or configuration may be disposed on the same rim 202. For example, plates 204 of alternating length 268 may be provided.

The tire system 200 may allow an attached scraping device 1 to travel the road by contacting the road with the rubber tracks 208a-208h. As the rim 202 rotates, each of the rubber tracks 208a-208h successively contacts the road. For example, as the rim 202 rotates, a first rubber track 208a may contact the road, subsequently a second rubber track 208b may contact the road, and so on, to allow the rotation of the tire system 200 and/or to provide movement to the scraping device 1.

In operation, the scraping device 1 (FIG. 8) may be employed in earthmoving operations. In the event that one or more of the tire segments 203 become worn or damaged, or the environmental or soil conditions change, it may be desirable to change out one or more of the tire segments 203. In conventional tire replacement operations, this may require bulky hoists or other tire replacement machinery that may not be available at the worksite, and significant machine downtime. In the currently disclosed system, the machine may be moved to a position where the tire segment 203 to be replaced is at an accessible position, the fasteners 206 released, and the new tire segment 203 put into position. In one embodiment, the overall dimensions and weight of the tire segments 203 may be selected to optimize this process. For example, the dimensions of the tire segments 203 may be selected to allow a single operator to lift, remove and position the tire segments 203 with greater efficiency, and without bulky or specialized equipment.

The tire system 200 may be used with the walking beam system 100 and the scraping device 1 to provide stability, ground clearance, and movement to the scraping device 1. Movement may be provided by the tire system 200 which may be the first tire 109 and/or the second tire 110 that may be mounted in the walking beam system 100. One purpose of conventional tires is to provide a flexible cushion between the machine 1 and operating surface. The walking beam system 100 is designed to provide a smoother ride over adverse terrain, which allows for a wider range of tracks 208 to be selected which may not have the cushioning capacity of traditional air-filled tires.

It should be understood that various changes and modifications to the presently preferred embodiments described herein will be apparent to those skilled in the art. Such changes and modifications may be made without departing from the spirit and scope of the present invention and without diminishing its attendant advantages.

What is claimed is:

1. An earthmoving scraping device, comprising:
   a bowl-shaped frame having a front end, a back end, and opposing first and second side walls extending upwardly from a frame floor, the first side wall, second side wall, and floor defining an interior of the frame for transporting material;
   at least one walking beam including:
   a suspension arm having a first end and a second end, the first end of the suspension arm pivotally connected to the back end of the frame;
   a beam having a front end, a back end, and first and second sides, the second end of the suspension arm being pivotally connected to the beam;
   a first axle extending from the first side of the beam and a second axle extending from the second side of the beam; and
   a tire system connected to each axle, the tire system including a cylindrical metal rim and a plurality of solid tire segments, the cylindrical metal rim including an outer surface, each tire segment including at least one track connected to a mounting plate, the mounting plates circumferentially positioned adjacent to the outer surface.

2. The scraping device of claim 1, further including a cylinder operatively connected between the back end of the frame and the suspension arm.

3. The scraping device of claim 1, wherein the scraping device includes a first walking beam and a second walking beam, each independently connected to the back end of the frame.

4. The scraping device of claim 3, further including a first cylinder connected between the back end of the frame and the suspension arm of the first walking beam, and a second cylinder connected between the back end of the frame and the suspension arm of the second walking beam.

5. The scraping device of claim 1, wherein the mounting plates include an outer surface connected to the at least one track, and an inner surface having a plurality of studs that extend through aligned openings of the rim.

6. The scraping device of claim 1, wherein the tire system further includes a plurality of fasteners connecting each mounting plate to the rim, each fastener extending through an opening in the rim and an aligned opening in the adjacent mounting plate.

7. The scraping device of claim 1, wherein each tire segment includes a single track, the track having an inner surface conforming in dimension to an outer surface of the mounting plate.

8. The scraping device of claim 1, wherein each tire segment is identical.

9. The scraping device of claim 1, wherein the rim and plates have aligned protrusions and recesses that engage the rim and plate.

10. The scraping device of claim 1, wherein the plates and tracks have aligned protrusions and recesses that engage the plates and tracks.

11. An earthmoving scraping device, comprising:
    a bowl-shaped frame having a front end, a back end, and opposing first and second side walls extending upwardly from a frame floor, the first side wall, second side wall, and floor defining an interior of the bowl-shaped frame for transporting material;
    a first walking beam and a second walking beam, each independently connected to the back end of the frame, each walking beam including:
    a suspension arm having a first end and a second end, the first end of the suspension arm pivotally connected to the frame;
    a beam having a front end, a back end, and first and second opposite sides, the second end of the suspension arm being pivotally connected to the beam, the front end of the beam being proximate the back end of the frame;
    a first axle extending from the first side at the front end of the beam;
    a second axle extending from the second side at the back end of the beam; and
    a tire system connected to each axle, the tire system including a cylindrical metal rim and a plurality of solid tire segments, the cylindrical metal rim including an outer surface, each tire segment including at least one track connected to a mounting plate, the mounting plates circumferentially positioned adjacent to the outer surface.

12. The scraping device of claim 11, further including a first cylinder connected between the back end of the frame and the suspension arm of the first walking beam, and a second cylinder connected between the back end of the frame and the suspension arm of the second walking beam.

13. The scraping device of claim 11, wherein the first axle of the first walking beam and the first axle of the second walking beam extend outwardly in opposite directions from a central longitudinal axis of the scraping device.

14. The scraping device of claim 11, the tire system further including a plurality of fasteners connecting each mounting plate to the rim, each fastener extending through an opening in the rim.

15. The scraping device of claim 11, wherein each tire segment is identical.

16. The scraping device of claim 11, wherein the rim and mounting plates have aligned protrusions and recesses that engage the rim and mounting plates.

17. An earthmoving, towed scraping device, comprising:
    a bowl-shaped frame having a front end, a back end, and opposing first and second side walls extending upwardly from a frame floor, the first side wall, second side wall, and floor defining an interior of the bowl-shaped frame for transporting material;
    a tongue extending from the front end of the frame and connected to a hitch;
    a first walking beam and a second walking beam, each independently connected to the back end of the frame, each walking beam including:
    a suspension arm having a first end and a second end, the first end of the suspension arm pivotally connected to the frame;
    a beam having a front end, back end, and first and second opposite sides, the second end of the suspension arm being pivotally connected to the beam, the front end of the beam being proximate the back end of the frame;
    a first axle extending from the first side at the front end of the beam;
    a second axle extending from the second side at the back end of the beam; and
    a tire system connected to each axle, the tire system including a cylindrical metal rim and a plurality of solid tire segments, the cylindrical metal rim including an outer surface, each tire segment including at least one track connected to a mounting plate, the mounting plates circumferentially positioned adjacent to the outer surface.

18. The scraping device of claim 17, each walking beam further including a cylinder connected between the back end of the frame and the suspension arm of the walking beam.

19. The scraping device of claim 17, wherein the first axle of the first walking beam and the first axle of the second walking beam extend outwardly in opposite directions from a central longitudinal axis of the scraping device.

20. The scraping device of claim 17, the tire system further includes a plurality of fasteners connecting each mounting plate to the rim, each fastener extending through an opening in the rim.

\* \* \* \* \*